United States Patent Office 2,949,455
Patented Aug. 16, 1960

2,949,455

CERTAIN 2-PHENYL-IMINO-3-PHENYL-THIAZOLIDINES

Charles Ferdinand Huebner, Chatham, N.J., assignor to Ciba Pharmaceutical Products, Inc., Summit, N.J., a corporation of New Jersey No Drawing. Filed Nov. 28, 1958, Ser. No. 776,751

2 Claims. (Cl. 260—240)

The present invention relates to new thiazolidine derivatives. More particularly, it concerns 2-phenyl-imino-3-phenylthiazolidines, in which each one of the phenyl radicals contains in the 4-position a group of the formula Py—$(CH=CH)_n$—, in which Py represents a pyridyl-group and $n$ a whole number from 1 to 2, and the salts thereof, as well as process for the preparation thereof.

Pyridyl in the above-mentioned substituent stands for 3-pyridyl, 4-pyridyl, or especially for 2-pyridyl radicals, which may be unsubstituted or contain as additional substituents lower alkyl, e.g. methyl or ethyl; nitro or amino groups, or halogen atoms, e.g. chlorine or bromine.

Salts of the new thiazolidine derivatives of this invention are particularly therapeutically acceptable acid addition salts, for example, those with inorganic acids, such as hydrohalic acids, e.g. hydrochloric or hydrobromic acid; sulfuric or phosphoric acids; or those with organic acids, such as acetic, propionic, glycolic, lactic, oxalic, malonic, maleic, fumaric, malic, tartaric, citric, hydroxymaleic, dihydroxymaleic, benzoic, salicylic, 4-aminosalicylic, methane sulfonic, ethane sulfonic or hydroxyethane sulfonic acid.

The new thiazolidine derivatives and the salts thereof inhibit the growth of different types of Mycobacteria, such as *Mycobacterium tuberculosis*, e.g. the human pathogenic strain H 37 Rv of *Mycobacterium tuberculosis* or *Mycobacterium leprae*, and may be used as antitubercular or antileprotic agents. For example, a good tuberculostatic activity may be obtained with 2-phenyl-imino-3-phenyl-thiazolidine derivatives, in which each of the phenyl radicals contains in 4-position a 2-(2-pyridyl)-ethenyl group.

The new compounds of this invention may be used as medicaments in the form of pharmaceutical preparations, which contain the new compounds, salts thereof or mixtures of these compounds in admixture with a pharmaceutical organic or inorganic, solid or liquid carrier suitable for enteral, e.g. oral, or parenteral administration. For making up the preparations there may be employed substances which do not react with the new compounds, such as water, gelatine, lactose, starches, stearic acid, magnesium stearate, stearyl alcohol, talc, vegetable oils, benzyl alcohols, gums, waxes, polyalkylene glycols, petroleum jelly or any other known carrier for medicaments. The pharmaceutical preparations may be, for example, in solid form, as tablets, dragees, or capsules, or in liquid form, for example, as solutions or emulsions. If desired, they may contain auxiliary substances, such as preserving agents, stabilizing agents, wetting or emulsifying agents, salts for varying the osmotic pressure or buffers. They may also contain, in combination, other therapeutically useful substances, particularly other antitubercular agents, such as, for example, 4-aminosalicylic acid, isonicotinic acid hydrazide, streptomycin or dihydrostreptomycin, or antileprotic agents, for example, sulfones, e.g. thiazolsulfone.

The new compounds, the salts thereof and mixtures of such compounds may be prepared by reacting a 1,3-diphenyl-2-thiourea, in which each of the phenyl radicals contains in the 4-position a group of the formula Py—$(CH=CH)_n$—, in which Py and $n$ have the above-given meaning, with a reactive ester of 1,2-ethanediol, and, if desired, converting a resulting salt into the base, and/or, if desired, converting a resulting base into the salts thereof.

A reactive ester of 1,2-ethanediol is particularly an ester with a strong inorganic acid, such as a hydrohalic acid, e.g. hydrochloric, hydrobromic or hydriodic acid; or sulfuric acid; or with a strong organic acid, such as an organic sulfonic acid, e.g. p-toluene sulfonic acid. 1,2-dichloroethane and, particularly, 1,2-dibromoethane are the preferred reactants. The reaction may be carried out in the absence of a solvent by using an excess of the reactive ester of 1,2-ethanediol as the solvent, and is completed by heating, for example, to the boiling point of the ester.

The starting materials used in the above reaction may be prepared according to procedures used for the manufacture of analogous compounds. Thus, symmetrically substituted 1,3-diphenyl-2-thioureas may be prepared by reacting an appropriately substituted aniline with thiophosgene or carbon disulfide; for example, 4-[2-(2-pyridyl)-ethenyl]-aniline, when reacted with carbon disulfide in the presence of potassium ethyl xanthate, yields the desired 1,3-bis-{4-[2-(2-pyridyl)-ethenyl]-phenyl}-2-thiourea. Asymmetrically substituted 1,3-diphenyl-2-thioureas may be prepared by treating a substituted phenylisothiocyanate with a substituted aniline. The thioureas may also be used in the form of their acid addition salts.

When asymmetrically substituted 1,3-diphenyl-2-thioureas are used the reaction product may be a mixture of two isomeric compounds, which may be separated into the single compounds, for example, by fractionated crystallization, adsorption and fractionated elution, etc. The mixture may also be used as such.

Depending on the conditions used the new compounds are obtained in the form of the free bases or as the salts thereof. A salt may be converted into the free base in the customary way, for example, by reaction with an aqueous alkaline reagent, such as an alkali metal hydroxide, e.g. sodium or potassium hydroxide; an alkali metal carbonate, e.g. sodium carbonate or potassium hydrogen carbonate; or ammonia. A free base may be transformed into its therapeutically acceptable acid addition salts by reaction with an appropriate inorganic or organic acid, such as one of those outlined above, for example, in a lower alkanol, e.g. methanol, ethanol, propanol, or isopropanol, solution. A reaction product may also be obtained as a hydrate; mono- or poly-salts may be formed.

The following example illustrates the invention and is not to be construed as being a limitation thereon. The temperatures are given in degrees centigrade.

*Example*

A mixture of 11.8 g. of 1,3-bis-{4-[2-(2-pyridyl)-ethenyl]-phenyl}-2-thiourea and 7 g. of 1,2-dibromo-ethane is heated to 130° for 40 minutes. On addition of an excess of ether a precipitate is formed, which is triturated with ethanol containing ammonia. The 2-{4-[2 - (2 - pyridyl) - ethenyl)] - phenyl} - imino - 3 - {4 - [2-(2-pyridly)-ethenyl]-phenyl}thiazolidine crystallizes.

The hydrochloride may be prepared by treating an alcohol solution of the base with hydrogen chloride and precipitating the resulting salt by the addition of ether.

The starting material may be prepared as follows: A solution of 15.7 g. of 4-[2-(2-pyridyl)-ethenyl]-aniline, 7.6 g. of carbon disulfide and 0.1 g. of potassium ethyl xanthate in 100 ml. of methanol is refluxed for two hours A precipitate is formed after about 1½ hours, which is filtered off after cooling. The resulting 1,3-bis-{4-[(2-pyridyl)-ethenyl]-phenyl}-2-thiourea is recrystallized from a mixture of chloroform and petroleum ether, M.P. 190–192°.

The mixture of 2-{4-[4-(2-pyridyl)-butadienyl]-phenyl} - imino - 3 - {4 - [2 - (4 - pyridyl) - ethenyl] - phenyl}-thiazolidine and 2-{4-[2-(4-pyridyl)-ethenyl]-phenyl} - imino - 3 - {4 - [4 - (2 - pyridyl) - butadienyl] - phenyl}-thiazolidine may be obtained by heating {4-[4-(2-pyridyl) - butadienyl] - phenyl} - 3 - {4 [2 - (4 - pyridyl)-ethenyl]-phenyl}-2-thiourea, prepared by treating 4-[2-(4-pyridyl)-ethenyl-phenylisothiocyanate with 4-[4-(2-pyridyl)-butadienyl]-aniline, with 1,2-dibromoethane according to the above-given procedure and the mixture may be separated into the single compounds by fractionated crystallization.

What is claimed is:
1. A member of the group consisting of 2-phenyl-imino-3-phenyl-thiazolidine, in which each of the phenyl radicals is substituted in the 4-position by the group of the formula Py—(CH=CH)$_n$—, in which Py represents a member of the group consisting of 2-pyridyl, 3-pyridyl and 4-pyridyl, and $n$ a whole number from 1 to 2, and therapeutically acceptable acid addition salts thereof.

2. 2 - {4 - [2 - (2 - pyridyl) - ethenyl] - phenyl} - imino - 3 - {4 - [2 - (2 - pyridyl) -ethenyl] - phenyl} - thiazolidine.

References Cited in the file of this patent

UNITED STATES PATENTS 2,877,232     Huebner _____ Mar. 10, 1959

OTHER REFERENCES

Chemical Abstracts, vol. 33, pp. 5394 to 5395 (1939) [Abstract of Dashen et al., Trans. Kansas Acad. Sci., vol. 40, pp. 103 to 107. (1937)].

Dains et al.: Jour. of the Amer. Chem. Soc, vol. 47, pp. 1987 to 1988 (1925).